United States Patent [19]
Ueda et al.

[11] Patent Number: 5,664,209

[45] Date of Patent: Sep. 2, 1997

[54] DOCUMENT PROCESSING APPARATUS FOR PROCESSING INFORMATION HAVING DIFFERENT DATA FORMATS

[75] Inventors: Hiroyuki Ueda, Yokohama; Yasuaki Yamada, Matsudo, both of Japan

[73] Assignee: Canon Kabushiki Kaisha, Tokyo, Japan

[21] Appl. No.: 427,716

[22] Filed: Apr. 21, 1995

Related U.S. Application Data

[63] Continuation of Ser. No. 965,566, Oct. 23, 1992, abandoned, which is a continuation of Ser. No. 644,748, Jan. 23, 1991, abandoned, which is a continuation of Ser. No. 157,145, Feb. 11, 1988, abandoned, which is a continuation of Ser. No. 704,600, Feb. 25, 1985, abandoned.

[30] Foreign Application Priority Data

Feb. 29, 1984 [JP] Japan ................. 59-35949

[51] Int. Cl.$^6$ ............................. G06F 17/21
[52] U.S. Cl. .................................. 395/785
[58] Field of Search ................. 395/200, 500, 395/600, 700, 785

[56] References Cited

U.S. PATENT DOCUMENTS

| | | | |
|---|---|---|---|
| 3,930,232 | 12/1975 | Wallach et al. | 341/78 X |
| 4,004,089 | 1/1977 | Richard et al. | 380/50 X |
| 4,172,213 | 10/1979 | Barnes et al. | 380/50 X |
| 4,200,913 | 4/1980 | Kumar et al. | 364/900 |
| 4,330,847 | 5/1982 | Kuseski | 395/775 |
| 4,498,147 | 2/1985 | Agnew et al. | 364/419 |
| 4,550,350 | 10/1985 | Billings | 360/60 X |
| 4,559,614 | 12/1985 | Peek et al. | 395/500 |
| 4,588,991 | 5/1986 | Atallo | 235/382 X |
| 4,595,911 | 6/1986 | Kregness et al. | 364/200 X |
| 4,604,710 | 8/1986 | Amezcua et al. | 395/500 |
| 4,956,809 | 9/1990 | George et al. | 395/700 |

*Primary Examiner*—Thomas G. Black
*Assistant Examiner*—John C. Loomis
*Attorney, Agent, or Firm*—Fitzpatrick, Cella, Harper & Scinto

[57] ABSTRACT

A document processing apparatus has a floppy disc for storing document information in one format, a key stroke train converter for reading the information from the floppy disc and converting it into information in another format, a processor for processing the information, and another floppy disc for storing the processed information.

6 Claims, 5 Drawing Sheets

DOCUMENT PROCESSING APPARATUS FOR PROCESSING INFORMATION HAVING DIFFERENT DATA FORMATS

This application is a continuation of application Ser. No. 07/965,566 filed Oct. 23, 1992; which is a continuation of 07/644,748 filed Jan. 23, 1991; which is a continuation of Ser. No. 07/157,145 filed Feb. 11, 1988; which is a continuation of Ser. No. 06/704,600 filed Feb. 25, 1985; all now abandoned.

BACKGROUND OF THE INVENTION

1. Field of the Invention

The present invention relates to a document processing apparatus which can process document information having different recording formats.

More particularly, the present invention relates to conversion of document information created by an electronic typewriter or a word processor and stored in a memory so as to establish compatibility between document information having different recording formats.

2. Description of the Prior Art

A document recording format conversion processing apparatus (i.e., conversion apparatus) is conventionally required to establish compatibility between documents created by different document processing apparatuses. This apparatus took a considerable amount of time to develop.

SUMMARY OF THE INVENTION

It is, therefore, an object of the present invention to provide a document processing apparatus wherein a conventional processing mechanism such as a word processor need not be modified, and additional software and hardware are minimized.

In order to achieve the above object of the present invention there is provided a document processing apparatus for converting document information recorded in a first format to that of a second format, comprising converting means for converting the first format to a key stroke data train, input means for selecting one of the key stroke train data or input data entered at keyboard means, control means connected to the input means, and inhibiting means for inhibiting the control means to perform display processing.

It is another object of the present invention to provide a document processing apparatus for converting character data train stored in a given format to that of another format and storing the converted data.

It is still another object of the present invention to provide a data processing apparatus for reading out data in a predetermined format from memory means in response to data entered at a keyboard and for converting the readout data to a key stroke data train.

It is still another object of the present invention to provide a document processing apparatus for inhibiting data input at the input means while document data stored in the memory means is being processed.

It is still another object of the present invention to provide steps for converting document data to that of the predetermined format.

It is still another object of the present invention to provide a data processing apparatus which can be connected to a detachable memory for performing data exchange and a keyboard for entering data, wherein the data from the memory is converted to a key stroke data train which is then supplied to an input terminal of the keyboard.

BRIEF DESCRIPTION OF THE DRAWINGS

FIGS. 5(1) to 5(3) are diagrams showing different recording formats, respectively;

DETAILED DESCRIPTION OF THE PREFERRED EMBODIMENT

The present invention will be described in detail with reference to the accompanying drawings.

Figure 1:
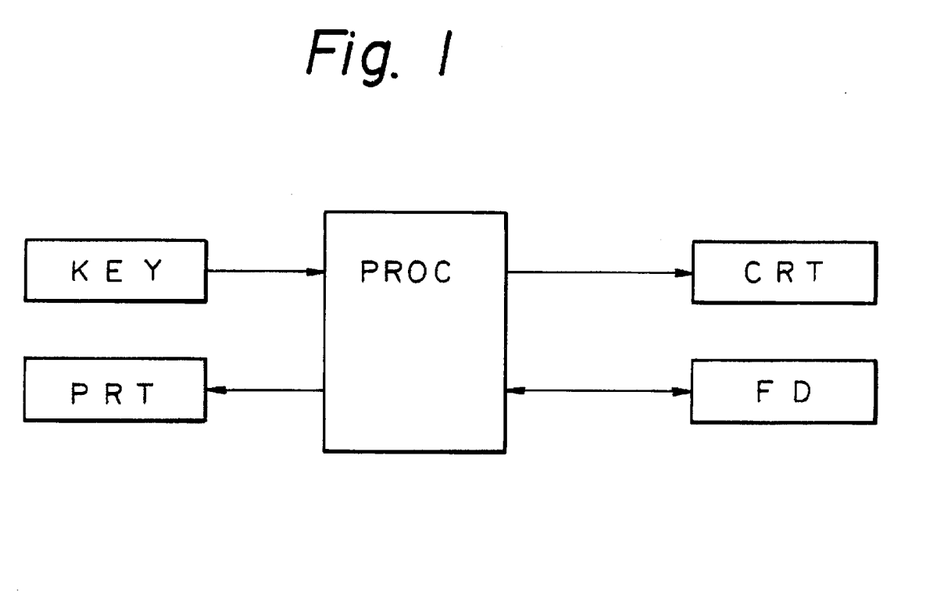
FIG. 1 is a block diagram showing the basic system configuration of a conventional word processor.

FIG. 1 shows the basic system configuration of a conventional word processor. The word processor comprises a keyboard KEY, a display unit CRT, a floppy disc drive FD, a printer PRT and a central processing unit PROC as the main unit thereof.

Figure 2:
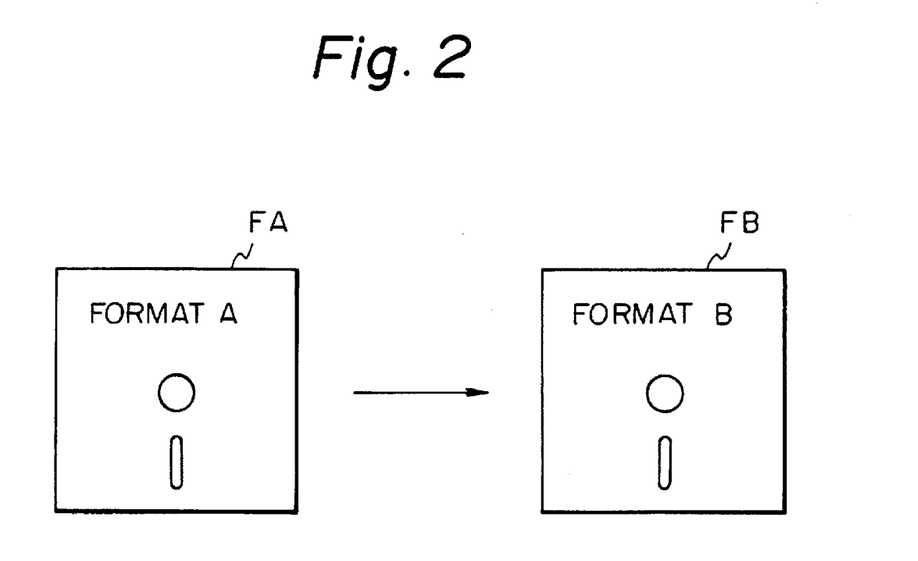
FIG. 2 is a representation for explaining conversion of document recording formats.

Assume that a document is recorded in format B in the floppy disc in the disc drive FD of the word processor, and that another document is recorded in format A by an electronic typewriter (not shown). In this case, the word processor cannot read data in format A from the floppy disc. As shown in FIG. 2, the data in format A in a floppy disc FA must be converted to format B in a floppy disc FB.

Figure 3:
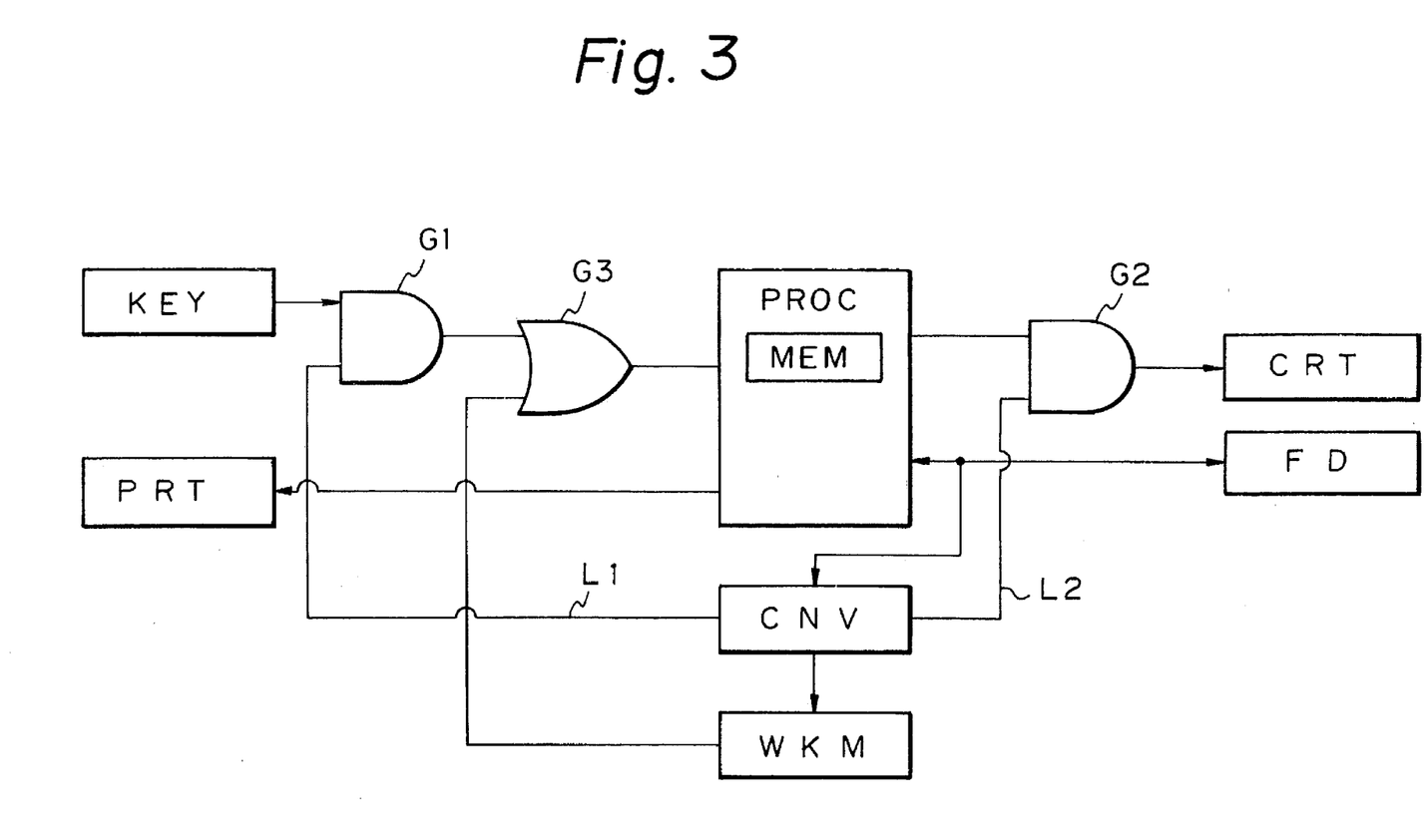
FIG. 3 is a block diagram showing the system configuration of a document processing apparatus according to an embodiment of the present invention.

FIG. 3 is a block diagram of a data processing apparatus according to an embodiment of the present invention. This processing apparatus has a keyboard KEY, a display unit CRT, a floppy disc drive FD, a printer PRT and a central processing unit PROC in the same manner as the apparatus of FIG. 1. The processing unit PROC is connected to the respective components so as to control the overall operation. The central processing unit PROC has an internal memory MEM for storing a control program to execute the operation of a flowchart shown in FIG. 6 The keyboard KEY is connected to one input terminal of a 2-input AND gate G1 and the other input terminal thereof is connected to a key stroke data train converter CNV for converting the contents of the floppy disc to a key stroke train (set). The output terminal of the AND gate G1 is connected to one input terminal of a 2-input OR gate G3, and the other input terminal thereof is connected to a working memory WKM. The output terminal of the OR gate G3 is connected to the central processing unit PROC. The input terminals of a 2-input AND gate G2 are connected to the processor PROC and the converter CNV. The output terminal of the AND gate G2 is connected to the display unit CRT.

Figure 4:
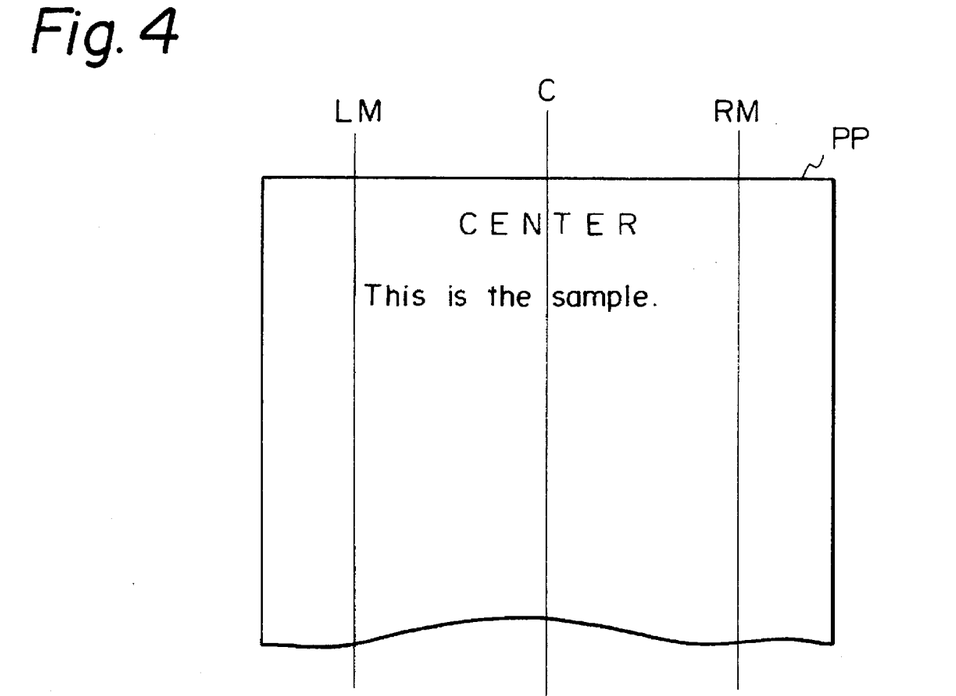
FIG. 4 is a representation showing a document processing function.
Figure 5:
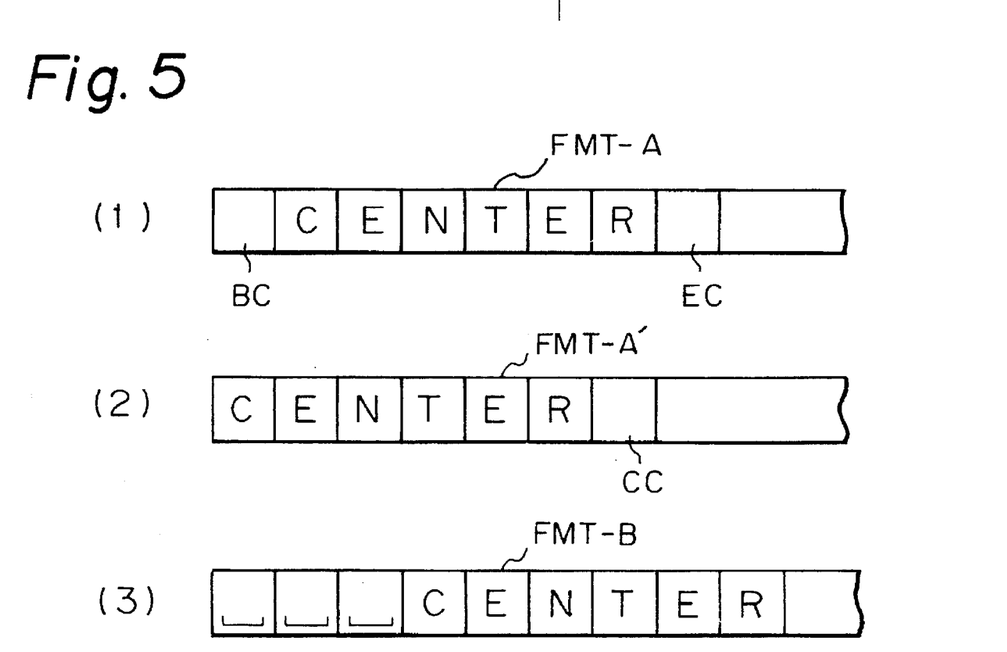

FIG. 4 is a representation for explaining document processing according to the present invention, exemplifying the centering function. Referring to FIG. 4, a character data train "CENTER" is printed at a center C between a left margin LM and a right margin RM. When such a character data train is transferred to the electronic typewriter (not shown), the data is stored in format A (FMT-A in FIG. 5(1)) in the floppy disc. The data format in FIG. 5(1) has a centering start code BC and a centering end code EC.

Figure 6:
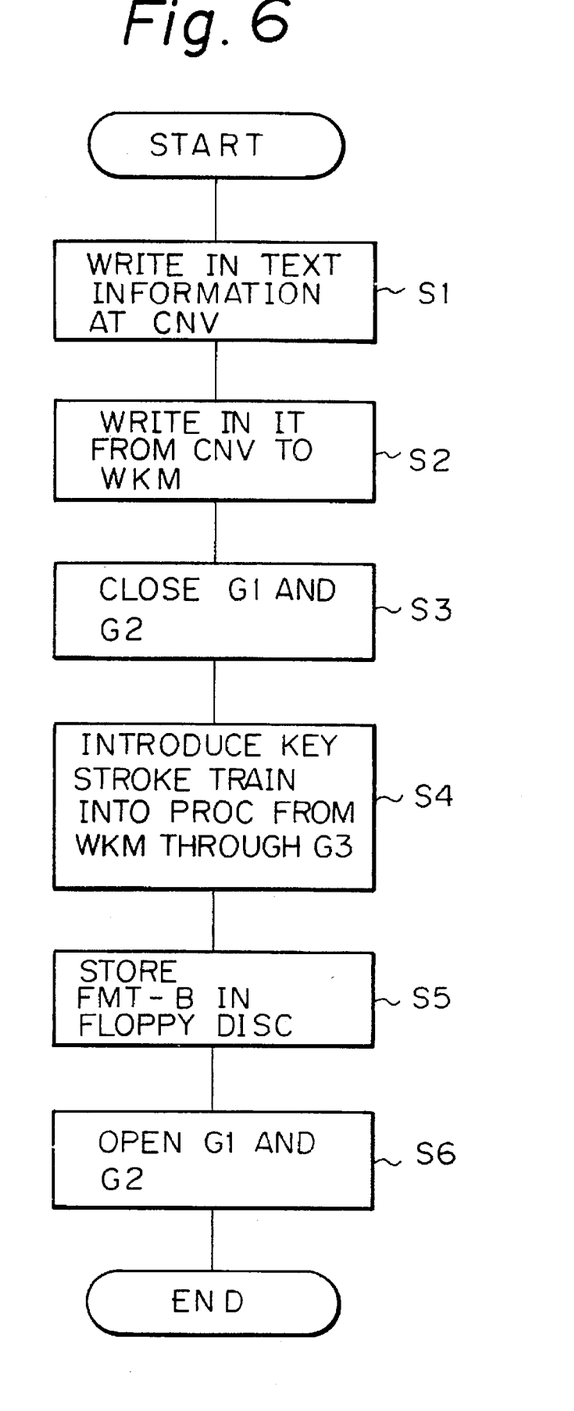
FIG. 6 is a flowchart for explaining the control steps of operations in the apparatus shown in FIG. 3.

FIG. 6 is a flow chart for explaining the case wherein the floppy disc is inserted in the floppy disc drive FD of FIG. 3 and a format conversion command is entered at the keyboard KEY.

The key stroke data train converter CNV reads out document data from the floppy disc drive FD (step S1). For example, when the converter CNV receives data in format A (FMT-A), the converter CNV evaluates the centering start and end codes, BC and EC, respectively, and determines that the character train between the codes BC and EC must be subjected to centering processing.

Subsequently, the key stroke data train converter CNV writes data in format A' (FMT-A' in FIG. 5(2)) in the working memory WKM in accordance with a preregistered operation (i.e., the same operation steps as when an operator enters data at the keyboard KEY) (step S2). When all the data are stored as a key stroke data train in the working memory WKM, the converter CNV closes the AND gates G1 and G2 through signal lines L1 and L2, respectively (step S3).

The key stroke data train is supplied from the working memory WKM to the processing unit PROC through the OR gate G3 (step S4), and automatic document processing is performed. As a result, the document in format B (FMT-B in FIG. 5(3)) is stored in the floppy disc. The document in format B can be directly read by the processing unit PROC in the word processor or the like.

When all the document data are stored in the floppy disc the key stroke data train converter CNV opens the AND gates G1 and G2 (step S6), and the normal word processing function can be restored.

As is apparent from the above description, an unnecessary key input is inhibited by the AND gate G1, and an unnecessary display operation is inhibited by the AND gate G2, thereby providing high-speed operation.

Figure 7:
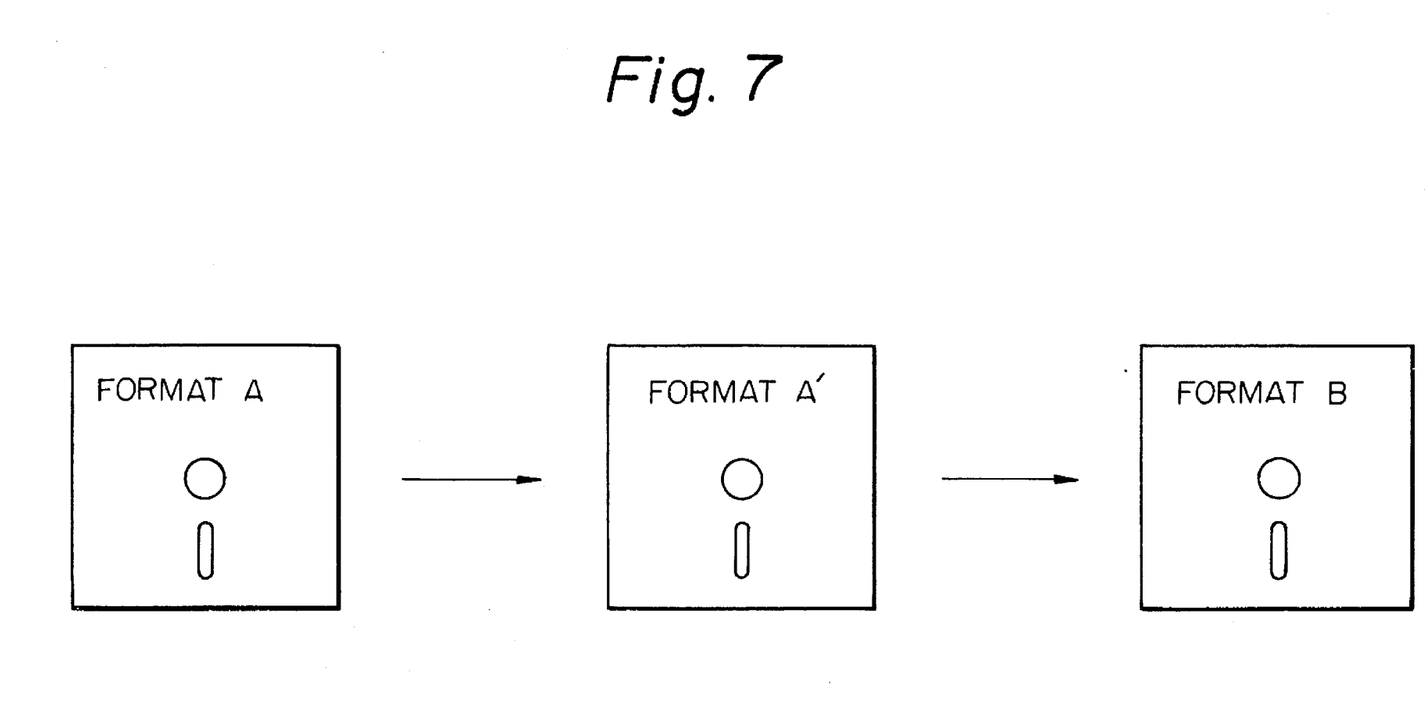
FIG. 7 is a representation showing the format conversion technique of the present invention.

In addition, as shown in FIG. 7, instead of using the working memory WKM, the key stroke train can be rewritten in a floppy disc to obtain the same effect as in the above embodiment.

According to the present invention, without modifying the conventional software and hardware, compatibility between different data formats can be established, thereby improving office automation efficiency.

What is claimed is:

1. A method of converting document data in a second format in which character data corresponding to character key stroke data and control data corresponding to command key stroke data and prescribing the arrangement of the character data are incorporated in an order independent of the order of entering the character key stroke data and the command key stroke data, to document data in a first format in which space data are inserted to shift and position of the character data in accordance with the arrangement prescribed by the command data which is not included in the document data in the first format, in a document processing apparatus which inputs key stroke data by a keyboard, processes the key stroke data including character key stroke data and command key stroke data representing command data prescribing the arrangement of character data to prepare document data in the first format by a processor and stores the prepared document data in the first format in a first memory of the apparatus, said method comprising the steps of:

reading out the document data in the second format from a second memory;

interpreting control data in the readout document data and determining a range of character data in the readout document data to be arranged in accordance with the control data;

converting the character data in the determined range to character key stroke data corresponding to the character data and converting the control data to command key stroke data corresponding to the control data;

setting the command key stroke data and the character key stroke data in the order that said command and character key stroke data would have been entered by the keyboard;

providing the key stroke data obtained by said converting step to the processor for processing the key stroke data to prepare document data in the first format while prohibiting the keyboard from inputting key stroke data to the processor; and storing the prepared document data in the first format in the first memory.

2. An apparatus according to claim 1, wherein said first memory means comprises a floppy disc.

3. An apparatus according to claim 1, wherein said second memory means comprises a floppy disc.

4. A document processing apparatus comprising:

a keyboard having a plurality of keys for entering key stroke data;

processing means, connected to said keyboard, for receiving the key stroke data including character key stroke data corresponding to character data and command key stroke data corresponding to command data prescribing the arrangement of the character data, for interpreting the command data, and for determining the character data to be arranged in accordance with the command data based on the order of entering the key stroke data to prepare document data in a first format in which space data are inserted to shift the position of the character data in accordance with the arrangement prescribed by the command data which is not included in the document data in the first format;

first memory means, connected to said processing means, for storing document data prepared by said processing means in the first format;

second memory means for storing document data in a second format in which character data corresponding to character key stroke data and control data corresponding to command key stroke data and prescribing the arrangement of the character data are incorporated in an order independent of the order of entering the character key stroke data and the command key stroke data and wherein the document data in the second format cannot be processed by said processing means as document data;

converting means, connected to said second memory means, for interpreting control data in the readout document data and determining a range of character data in the readout document data to be arranged in accordance with the control data and for converting the character data in the determined range to character key stroke data corresponding to the character data and converting the control data to command key stroke data corresponding to the control data and setting the command key stroke data and the character key stroke data in the order that said command and character key stroke data would have been entered by said keyboard;

control means for providing the key stroke data obtained from said converting means to said processing means, wherein the key stroke data obtained from said converting means is processed by said processing means to prepare document data in the first format corresponding to the key stroke data and the document data is stored in said first memory means in the first format; and prohibiting means for prohibiting said processing means from receiving key stroke data from said keyboard while the key stroke data is provided from said converting means.

5. A document data processing apparatus, which is connectable to a detachable memory, for performing data exchange comprising:

keyboard means for inputting key stroke data;

converting means, connected to said detachable memory, for reading out document data in a first format from the detachable memory, wherein in the first format the document data includes character data and control data prescribing the arrangement of the character data in the document data and wherein said converting means interprets the control data and determines a range of character data in the readout document data to be arranged in accordance with the control data and converts the character data in the determined range to character key stroke data corresponding to the character data and converts the control data to command key stroke data corresponding to the control data and sets the command key stroke data and the character key stroke data in the order that said command and character key stroke data would have been entered by said keyboard means;

processing means, connected to said keyboard means and said converting means, for receiving character key stroke data corresponding to character data and command key stroke data corresponding to command data prescribing the arrangement of the character data input by said keyboard means or converted by said converting means, for interpreting the command data, and for determining the character data to be arranged in accordance with the command data based on the order of entering the key stroke data to prepare document data in a second format in which space data are inserted to shift the position of the character data in accordance with the arrangement prescribed by the command data which is not included in the document data in the first format;

input prohibiting means, connected to said keyboard means and said converting means, for prohibiting said keyboard means from inputting key stroke data to said processing means when the key stroke data is provided to said processing means from said converting means to said processing means; and control means, connected to said processing means and connectable to said detachable memory, for controlling document data obtained from processing by said processing means to store the document data in the second format in said detachable memory.

6. An apparatus according to claim 5, wherein said processing means has switching means for switching between the input from said keyboard means and the input from said converting means.

* * * * *

UNITED STATES PATENT AND TRADEMARK OFFICE
CERTIFICATE OF CORRECTION

PATENT NO. : 5,664,209

DATED : September 2, 1997

INVENTOR(S) : HIROYUKI UEDA, ET AL.

It is certified that error appears in the above-identified patent and that said Letters Patent is hereby corrected as shown below:

COLUMN 1

Line 37, "invention" should read --invention,--.

COLUMN 2

Line 45, "FIG. 6" should read --FIG. 6.--.

COLUMN 3

Line 27, "disc" should read --disc,--.

COLUMN 4

Lines 15-16, should read --2. A method of converting document data according to Claim 1, further comprising providing the first memory as a floppy disc.--

UNITED STATES PATENT AND TRADEMARK OFFICE
CERTIFICATE OF CORRECTION

PATENT NO. : 5,664,209
DATED : September 2, 1997
INVENTOR(S) : HIROYUKI UEDA, ET AL.

It is certified that error appears in the above-identified patent and that said Letters Patent is hereby corrected as shown below:

Lines 17-18, should read --3. A method of converting document data according to Claim 1, further comprising providing the second memory as a floppy disc.--.

Signed and Sealed this

Seventeenth Day of March, 1998

Attest:

BRUCE LEHMAN

*Attesting Officer*    *Commissioner of Patents and Trademarks*